United States Patent
Kim et al.

(10) Patent No.: US 12,494,551 B2
(45) Date of Patent: Dec. 9, 2025

(54) BATTERY PACK HAVING MOVABLE BUSBAR ASSEMBLY AND SECONDARY BATTERY INCLUDING THE SAME

(71) Applicant: LG ENERGY SOLUTION, LTD., Seoul (KR)

(72) Inventors: Yong Il Kim, Daejeon (KR); Kang Won Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1176 days.

(21) Appl. No.: 17/424,807

(22) PCT Filed: Jul. 30, 2020

(86) PCT No.: PCT/KR2020/010061
§ 371 (c)(1),
(2) Date: Jul. 21, 2021

(87) PCT Pub. No.: WO2021/025374
PCT Pub. Date: Feb. 11, 2021

(65) Prior Publication Data
US 2022/0123438 A1 Apr. 21, 2022

(30) Foreign Application Priority Data
Aug. 2, 2019 (KR) .......... 10-2019-0094564

(51) Int. Cl.
*H01M 50/507* (2021.01)
*H01M 50/572* (2021.01)

(52) U.S. Cl.
CPC ....... *H01M 50/507* (2021.01); *H01M 50/572* (2021.01)

(58) Field of Classification Search
CPC .......... H01M 50/507; H01M 50/548
See application file for complete search history.

(56) References Cited

U.S. PATENT DOCUMENTS

| | | | |
|---|---|---|---|
| 2011/0076546 A1* | 3/2011 | Choi | H01M 10/0413 429/158 |
| 2015/0037634 A1* | 2/2015 | Malcolm | H05K 1/18 429/90 |

(Continued)

FOREIGN PATENT DOCUMENTS

| | | |
|---|---|---|
| CN | 104769746 A | 7/2015 |
| CN | 206332074 U | 7/2017 |

(Continued)

OTHER PUBLICATIONS

Extended European Search Report for European Application No. 20849176.1, dated Mar. 4, 2022.

(Continued)

*Primary Examiner* — Barbara L Gilliam
*Assistant Examiner* — Jordan E Berresford
(74) *Attorney, Agent, or Firm* — Birch, Stewart, Kolasch & Birch, LLP

(57) ABSTRACT

A battery pack has a movable busbar assembly and a secondary battery including the same. More particularly, a battery pack has a movable busbar assembly configured such that at least one of a first busbar frame located at the front surface of a pack case, a second busbar frame located at the rear surface of the pack case, a first busbar connected to the first busbar frame, and a second busbar connected to the second busbar frame is movable in a direction toward a side plate of the pack case, whereby it is possible to minimize short circuit between leads, and a secondary battery including the same.

19 Claims, 11 Drawing Sheets

(56) References Cited

U.S. PATENT DOCUMENTS

| | | |
|---|---|---|
| 2015/0064540 A1 | 3/2015 | Roh et al. |
| 2015/0303415 A1 | 10/2015 | Kayano et al. |
| 2016/0344011 A1 | 11/2016 | Ogawa et al. |
| 2017/0279160 A1 | 9/2017 | Kim |
| 2017/0288199 A1 | 10/2017 | Nakayama et al. |
| 2018/0097322 A1 | 4/2018 | Harris, III |
| 2018/0102521 A1 | 4/2018 | Cho et al. |
| 2018/0194235 A1 | 7/2018 | Kim et al. |
| 2019/0181418 A1 | 6/2019 | Son et al. |
| 2019/0221787 A1 | 7/2019 | Yanagida et al. |
| 2019/0221794 A1 | 7/2019 | Hsu |
| 2020/0144580 A1 | 5/2020 | Hong et al. |
| 2020/0176745 A1 | 6/2020 | Lee |
| 2020/0189400 A1 | 6/2020 | Kim et al. |
| 2020/0411832 A1 | 12/2020 | Jin et al. |
| 2022/0021083 A1* | 1/2022 | Takahashi ........... H01M 50/503 |

FOREIGN PATENT DOCUMENTS

| | | |
|---|---|---|
| EP | 2 919 294 A1 | 9/2015 |
| JP | 2014-32949 A | 2/2014 |
| JP | 2015-520922 A | 7/2015 |
| JP | 2015-159024 A | 9/2015 |
| JP | 2016-51671 A | 4/2016 |
| JP | 2016-219270 A | 12/2016 |
| JP | 2019-29105 A | 2/2019 |
| JP | 2019-125474 A | 7/2019 |
| KR | 10-2014-0012264 A | 2/2014 |
| KR | 10-2015-0060830 A | 6/2015 |
| KR | 10-2016-0131416 A | 11/2016 |
| KR | 10-2017-0052989 A | 5/2017 |
| KR | 10-2017-0087084 A | 7/2017 |
| KR | 10-2017-0103232 A | 9/2017 |
| KR | 10-2017-011046 A | 10/2017 |
| KR | 10-2019-0054709 A | 5/2019 |
| KR | 10-2019-0063814 A | 6/2019 |
| KR | 10-2019-0069129 A | 6/2019 |
| KR | 10-2019-0071454 A | 6/2019 |
| WO | WO 2014/073443 A1 | 5/2014 |
| WO | WO 2019/117514 A1 | 6/2019 |

OTHER PUBLICATIONS

International Search Report for PCT/KR2020/010061 (PCT/ISA/210) mailed on Nov. 13, 2020.

* cited by examiner

【FIG. 1】
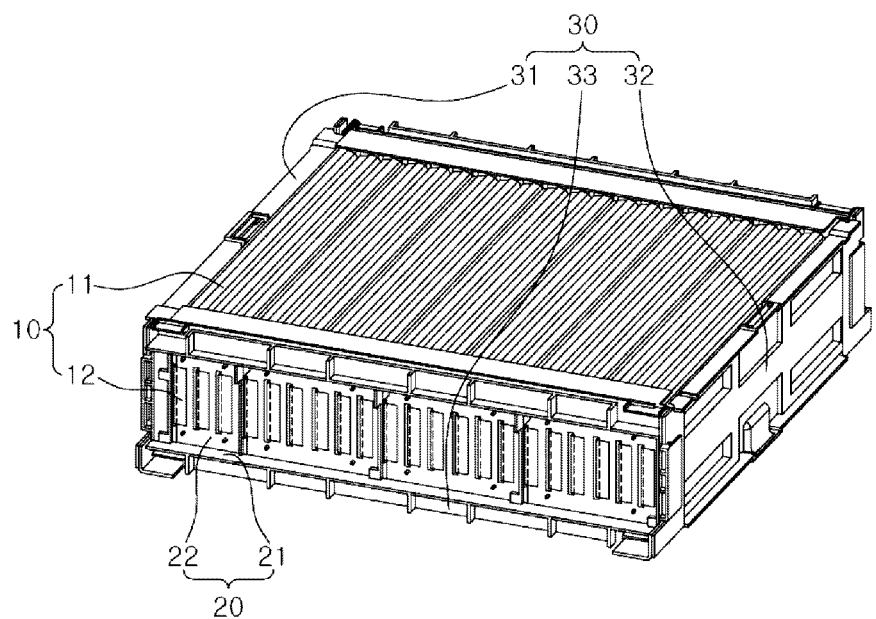
Conventional Art

[FIG. 2]
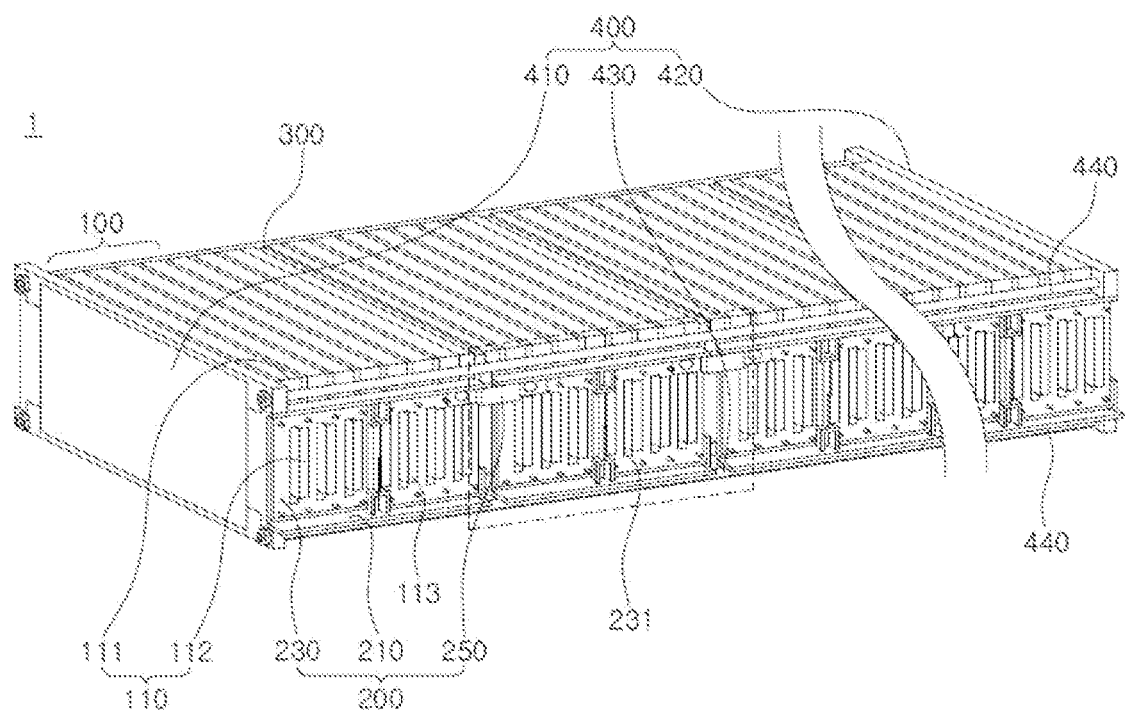

[FIG. 3]
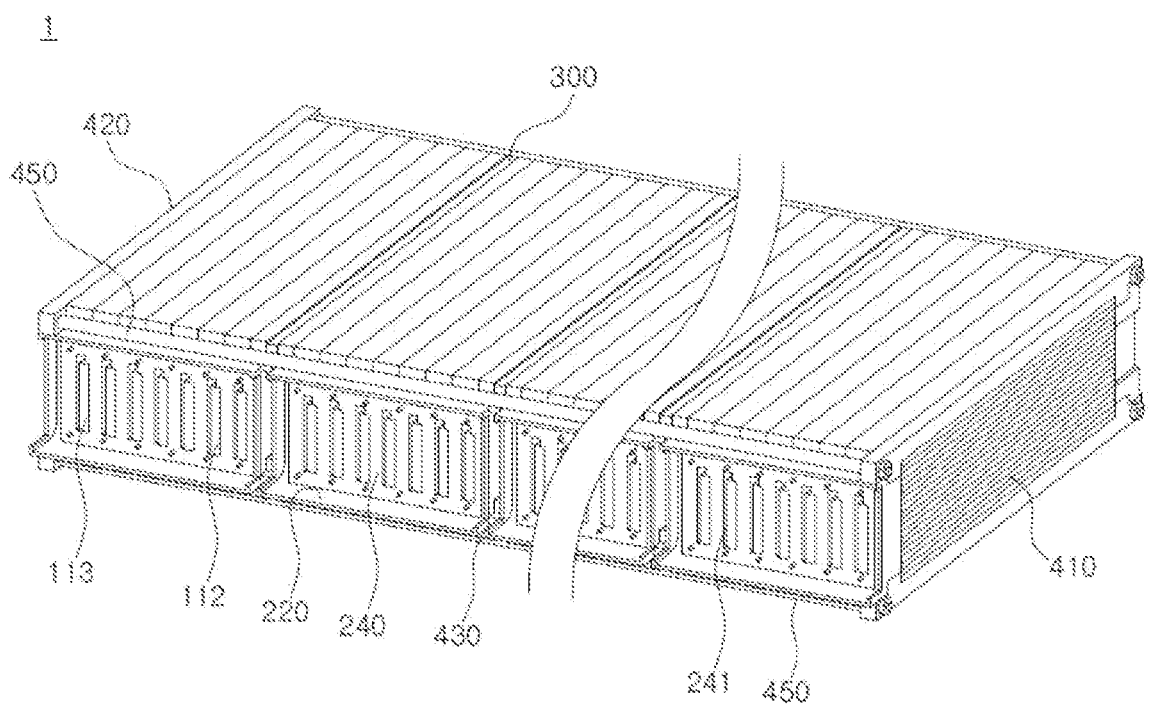

【FIG. 4】
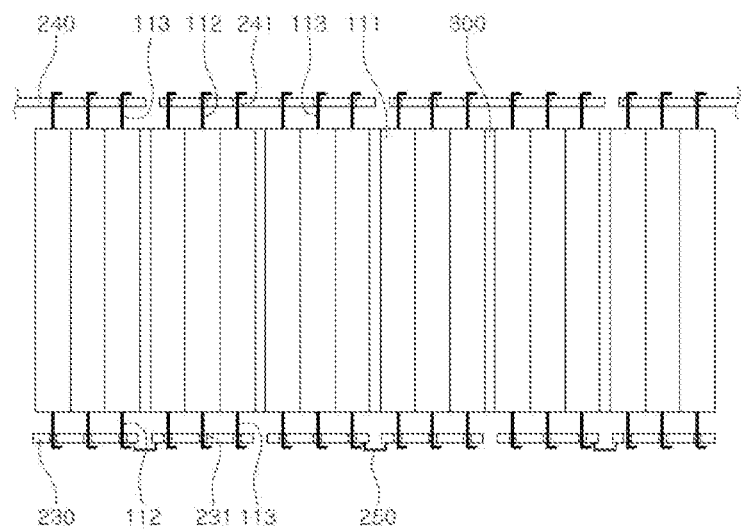
【FIG. 5】
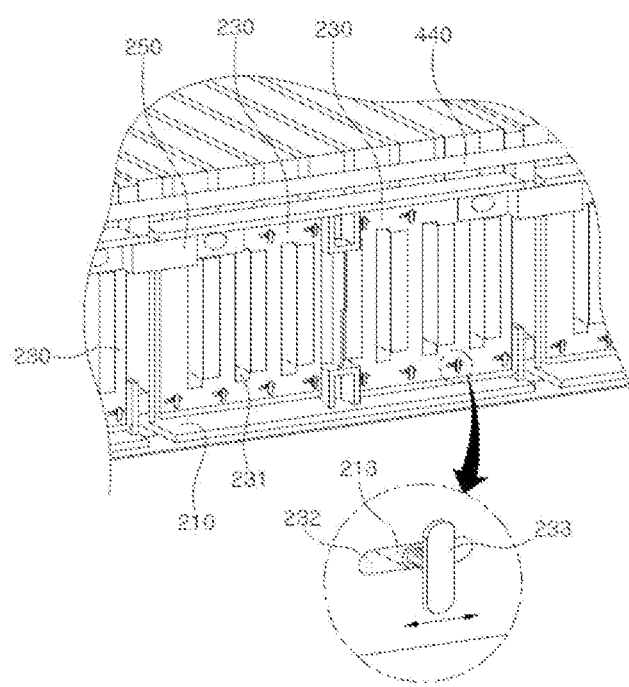

[FIG. 6]
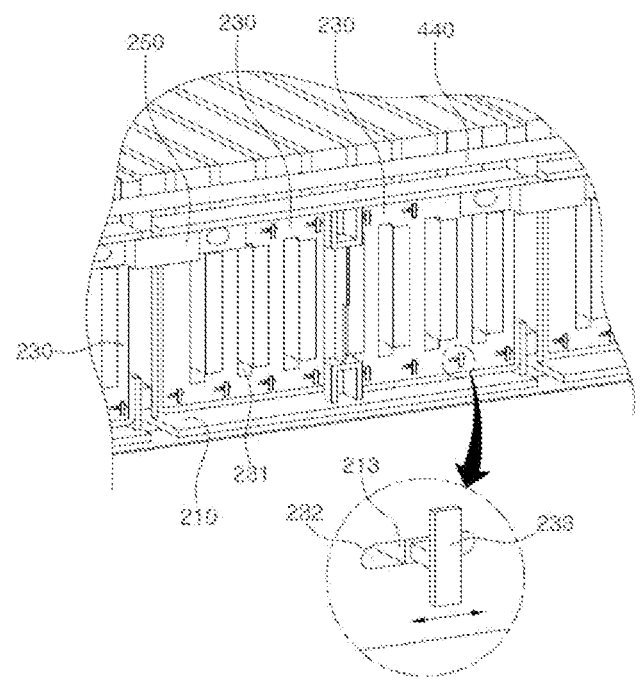

[FIG. 7]
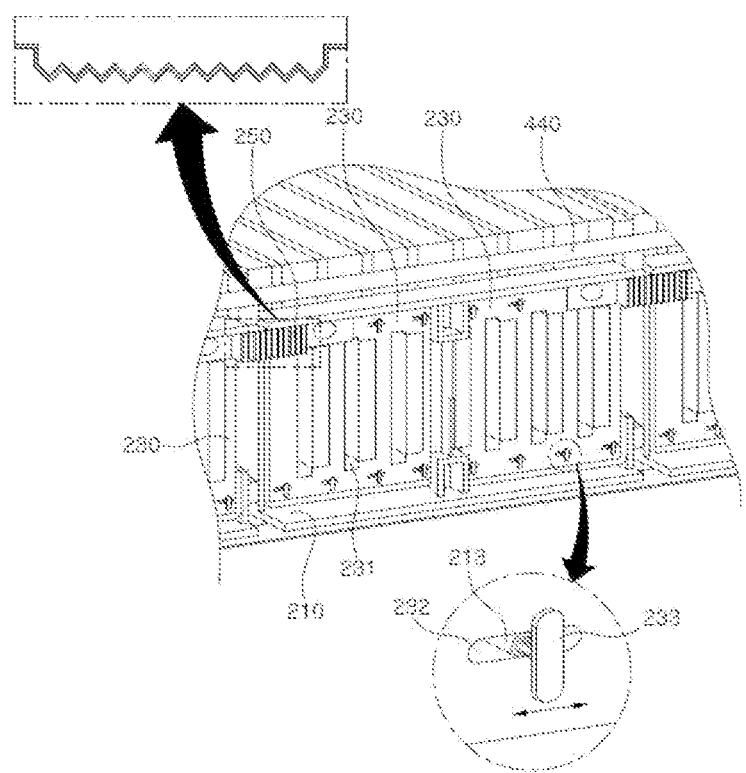

[FIG. 8]
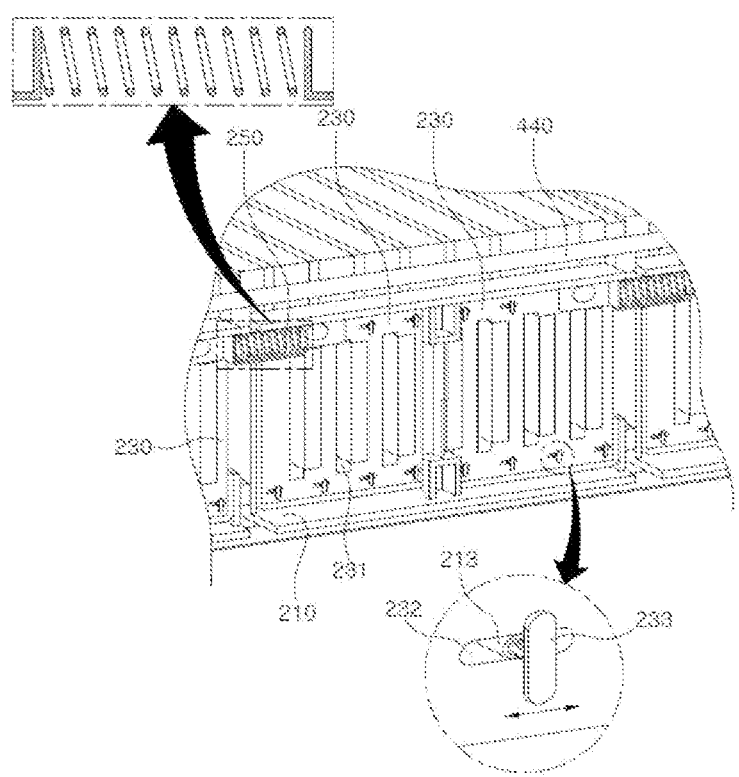

【FIG. 9】
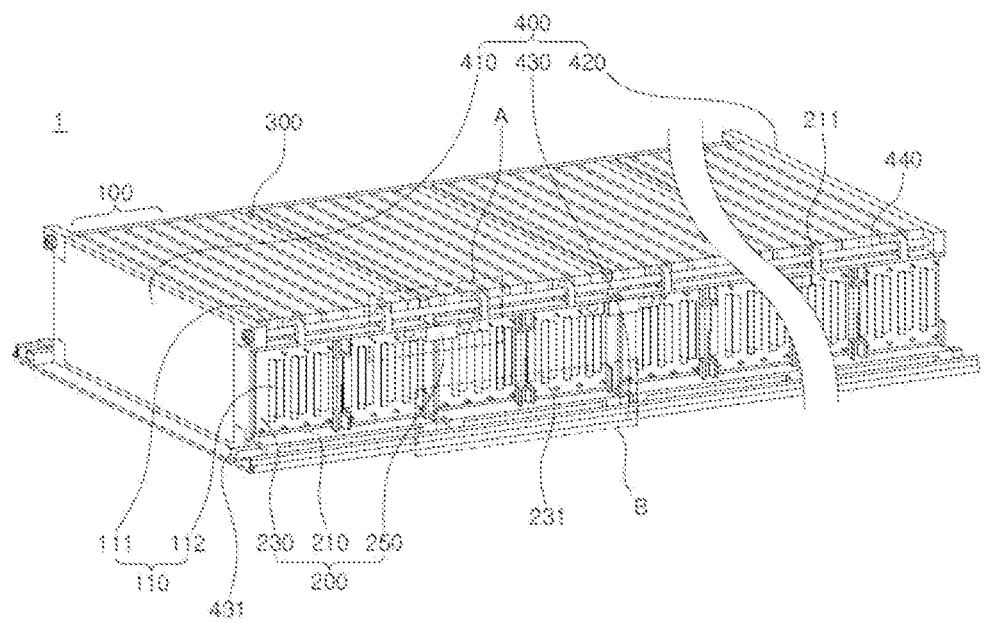
【FIG. 10】
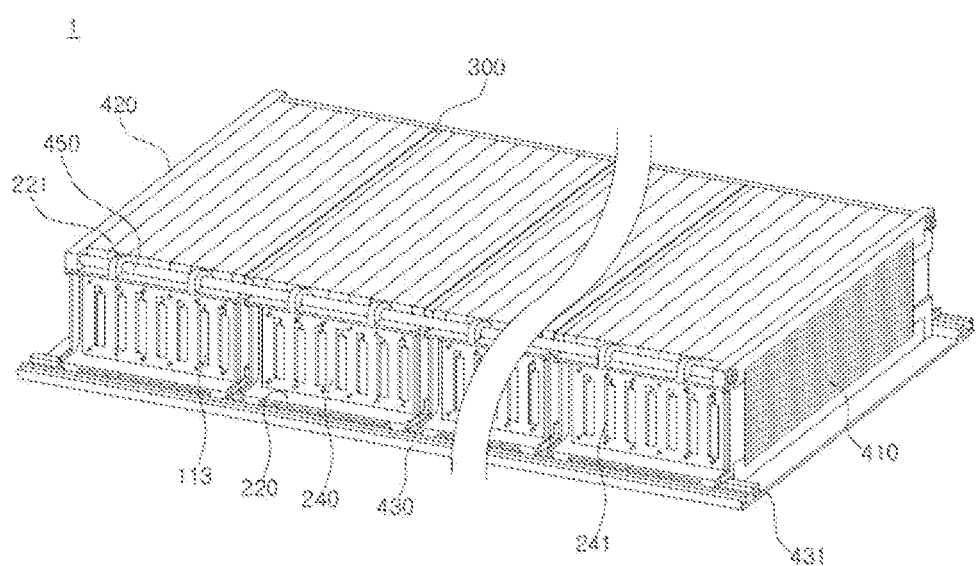

[FIG. 11]
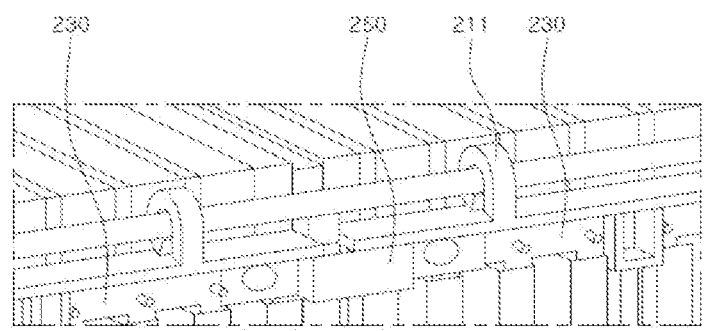
[FIG. 12]
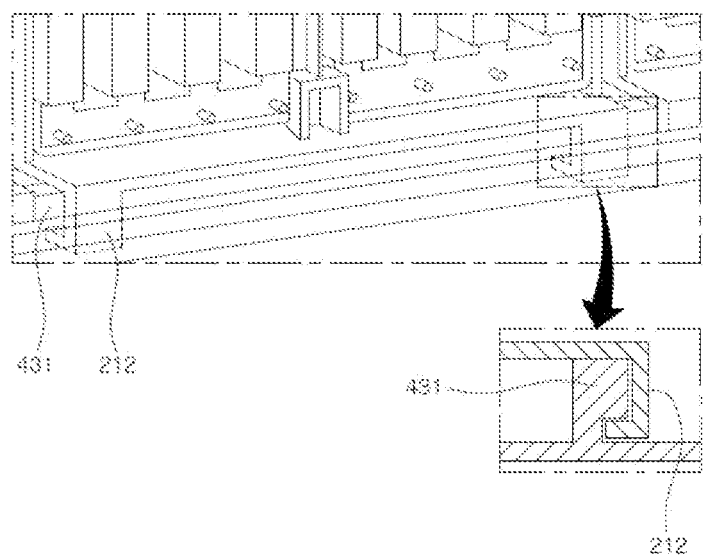

【FIG. 13】
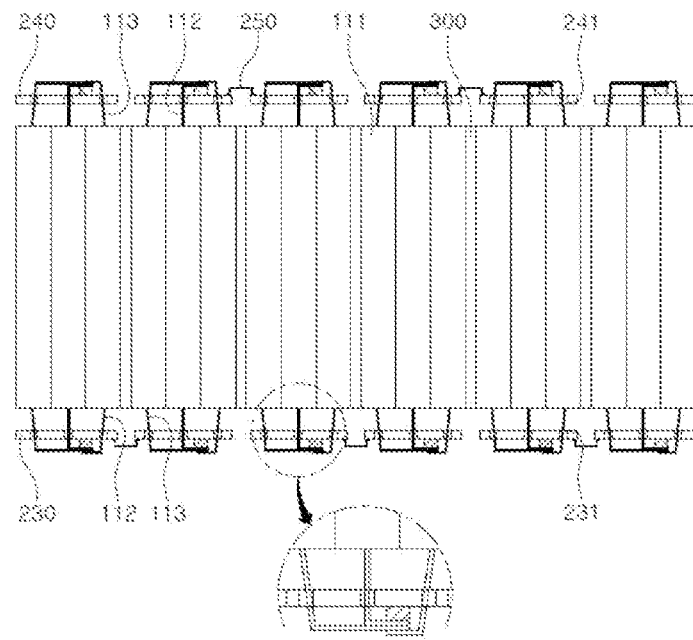
【FIG. 14】
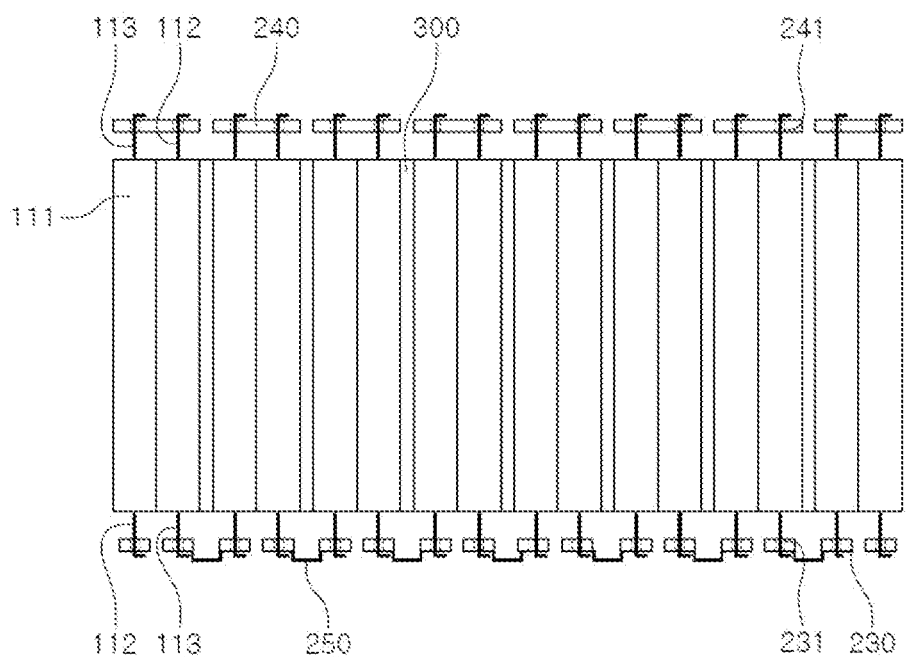

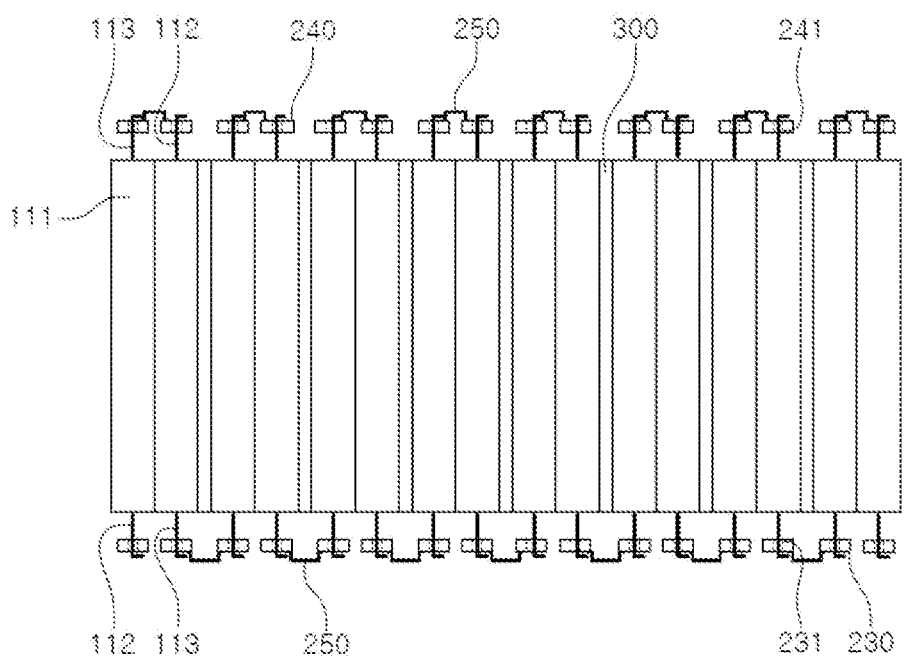
[FIG. 15]

BATTERY PACK HAVING MOVABLE BUSBAR ASSEMBLY AND SECONDARY BATTERY INCLUDING THE SAME

TECHNICAL FIELD

This application claims the benefit of priority to Korean Patent Application No. 2019-0094564 filed on Aug. 2, 2019, the disclosure of which is hereby incorporated by reference herein its entirety.

The present invention relates to a battery pack having a movable busbar assembly and a secondary battery including the same, and more particularly to a battery pack having a movable busbar assembly configured such that at least one of a first busbar frame located at the front surface of a pack case, a second busbar frame located at the rear surface of the pack case, a first busbar connected to the first busbar frame, and a second busbar connected to the second busbar frame is movable in a direction toward a side plate of the pack case, whereby it is possible to minimize short circuit between leads, and a secondary battery including the same.

BACKGROUND ART

With technological development of mobile devices, such as mobile phones, laptop computers, camcorders, and digital cameras, and an increase in the demand therefor, research on secondary batteries, which are capable of being charged and discharged, has been actively conducted. In addition, secondary batteries, which are energy sources substituting fossil fuels causing air pollution, have been applied to an electric vehicle (EV), a hybrid electric vehicle (HEV), and a plug-in hybrid electric vehicle (P-HEV), and therefore there is increasing necessity for development of secondary batteries.

There are a nickel-cadmium battery, a nickel-hydride battery, a nickel-zinc battery, and a lithium secondary battery as currently commercialized secondary batteries. Thereamong, the lithium secondary battery is in the spotlight, since the lithium secondary battery has little memory effect, whereby the lithium secondary battery is capable of being freely charged and discharged, has a very low self-discharge rate, and has high energy density, compared to the nickel-based secondary batteries.

In such a lithium secondary battery, a lithium-based oxide and a carbon material are used as a positive electrode active material and a negative electrode active material, respectively. The lithium secondary battery includes an electrode assembly, configured such that a positive electrode plate covered with a positive electrode active material and a negative electrode plate covered with a negative electrode active material are disposed in the state in which a separator is interposed therebetween, and a sheathing member configured to receive the electrode assembly together with an electrolytic solution in a sealed state, i.e. a battery case.

Based on the shape of a battery case, secondary batteries are classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet.

A secondary battery used for small devices includes a few battery cells. For vehicles, however, a battery module includes a plurality of battery cells electrically connected to each other. The plurality of battery cells is connected to each other in series and in parallel in order to increase capacity and output of the battery module. In this case, the plurality of battery cells, i.e. secondary batteries, is stacked, and the battery module generally includes a busbar module configured to electrically connect the battery cells to each other. The busbar module includes a busbar configured to connect electrode leads, connected to the respective battery cells, to each other. The busbar module may be formed at one side surface of the battery module.

FIG. 1 is a perspective view of a conventional battery pack. As shown in FIG. 1, the conventional battery pack includes a submodule having at least two unit cells 10 disposed in parallel, each of the unit cells 10 including an electrode assembly 11 and a positive electrode lead 12 and a negative electrode lead protruding from opposite sides of the electrode assembly 11, a busbar assembly 20 including busbars 22 electrically connected to leads of the submodule and busbar frames 21 configured to support the busbars 22, and a pack case 30 configured to support the busbar assembly 20 while receiving the submodule.

That is, in order to satisfy high capacity of an electric vehicle or a hybrid electric vehicle, a plurality of batteries is connected to each other, as shown in FIG. 1. At this time, the leads are fixed to the busbars 22 by welding and the busbars 22 are fixed to the pack case 30 via the busbar frames 21.

Meanwhile, a battery swelling phenomenon in which the unit cells swell may occur due to various causes, such as repeated charging and discharging, overcharging, and external impact. Consequently, adjacent unit cells may be pushed toward side plates 31 and 32 of the pack case. As a result, the battery pack may catch fire or explode due to internal short circuit. Furthermore, the battery pack may expand exceeding an allowable space in which the battery pack is installed, whereby safety of a structure around the battery pack may be deteriorated.

More specifically, a cell stack includes a minimum of several unit cells or a maximum of several tens of unit cells that are stacked side by side. In the case in which the unit cells expand due to swelling, the unit cells located at the edge of the stack are greatly pushed from the original positions thereof to the outside. Since the busbar and the busbar frame are fixed to the original positions thereof, however, high tensional force is generated at the leads, which connect the unit cells and the busbars to each other, whereby the leads may be cut. As a result, performance of the unit cells and the battery pack is deteriorated.

In order to solve the above problem, Patent Document 1 discloses a busbar module configured such that an inverse U-shaped connection piece is provided between support frames of a support member integrally formed with a plurality of busbars by insert molding, wherein the connection piece is bendable or deformable.

Patent Document 2 discloses a busbar including a first terminal connection portion configured to contact a terminal of a battery cell, the first terminal connection portion being formed of a conductive conical elastic member, and a second terminal connection portion configured to contact a terminal of another battery cell, the second terminal connection portion being formed of a conductive conical elastic member, the first terminal connection portion and the second terminal connection portion being spaced apart from each other by a distance between the terminals, and a battery module.

Patent Document 3 discloses a battery system configured to interrupt the supply of power to a battery cell module when a swelling phenomenon occurs due to overcharging.

However, Patent Documents 1 and 2 have a problem in that it is difficult to secure a sufficient movement distance due to battery swelling, and Patent Document 3 has a problem in that it is not possible to use a battery even though the lifespan of the battery remains.

Prior Art Documents

Patent Documents

Japanese Patent Application Publication No. 2015-159024 ("Patent Document 1")
Japanese Patent Application Publication No. 2016-219270 ("Patent Document 2")
Korean Patent Application Publication No. 2014-0012264 ("Patent Document 3")

DISCLOSURE

Technical Problem

The present invention has been made in view of the above problems, and it is an object of the present invention to provide a battery pack capable of reducing a load applied to tabs and leads of unit cells and connections between the leads and busbars even when a swelling phenomenon occurs, whereby it is possible to prevent damage to the tabs and the leads of the unit cells and to the connections between the leads and the busbars, and a secondary battery including the same.

It is another object of the present invention to provide a battery pack that is capable of preventing a reduction in performance of a battery and furthermore preventing combustion and explosion of the battery due to malfunction of some unit cells caused when swelling occurs due to use of the battery, such as repeated charging and discharging of the battery, and a natural phenomenon and a secondary battery including the same.

Technical Solution

In order to accomplish the above objects, a battery pack according to the present invention includes a plurality of submodules (100), each of the plurality of submodules (100) having one or more unit cells (110) disposed therein, each of the one or more unit cells (110) including an electrode assembly (111) and a positive electrode lead (112) and a negative electrode lead (113) disposed at opposite sides of the electrode assembly (111); a busbar assembly (200) configured to connect the plurality of submodules (100) to each other in series or in parallel, the busbar assembly (200) including a first busbar frame (210), a second busbar frame (220), a first busbar (230) connected to the first busbar frame (210), and a second busbar (240) connected to the second busbar frame (220); and a pack case (400) configured to support the busbar assembly (200) while receiving the plurality of submodules (100), the pack case (400) including a first side plate (410) located at one side of the submodules (100) side by side, a second side plate (420) located at the other side of the submodules (100) side by side, and a bottom plate (430) located at the bottom of the submodules (100), wherein at least one of the first busbar frame (210), the second busbar frame (220), the first busbar (230), and the second busbar (240) is movable in a direction toward the first side plate (410) or the second side plate (420).

Also, in the battery pack according to the present invention, the plurality of submodules (100) may be N submodules, N being a natural number equal to or greater than 3, each of the N submodules having two or more unit cells (110) disposed in parallel, and in order to connect the N submodules (100) to each other in series, the first busbar frame (210), the first busbar (230), and a connection busbar (250) configured to connect every two adjacent submodules (100) after an N-2th submodule (100) to each other in series may be located at the front surface of the pack case (400), and the second busbar frame (220) and the second busbar (240), configured to connect every two adjacent submodules (100) from the N-2th submodule (100) to each other in series, may be located at the rear surface of the pack case (400).

Also, in the battery pack according to the present invention, the submodules (100) may be N submodules, N being a natural number equal to or greater than 2, each of the N submodules having two unit cells (110) located such that a positive electrode terminal and a negative electrode terminal are opposite each other, and to connect the two unit cells (110) to each other in series, a positive electrode lead (112) and a negative electrode lead (113) disposed at a first side may be respectively fixed to a plurality of first busbars (230) located so as to be spaced apart from each other by a predetermined distance, and a negative electrode lead (113) and a positive electrode lead (112) disposed at a second side may be fixed to a second busbar (240).

Also, in the battery pack according to the present invention, the submodules (100) may be N submodules, N being a natural number equal to or greater than 2, each of the N submodules having one unit cell (110), and to connect the unit cells (110) to each other in series, a positive electrode lead (112) and a negative electrode lead (113) disposed so as to be adjacent to each other at a first side may be fixed to the first busbar (230), and a negative electrode lead (113) and a positive electrode lead (112) disposed so as to be adjacent to each other at a second side may be fixed to the second busbar (240).

Also, in the battery pack according to the present invention, only the first busbar frame (210) or the second busbar frame (220) may be movable in the state in which the first busbar (230) and the second busbar (240) are fixed respectively to the first busbar frame (210) and the second busbar frame (220).

Also, in the battery pack according to the present invention, a fixing shaft may be provided between the first side plate (410) and the second side plate (420), and the first busbar frame (210) or the second busbar frame (220) may be provided with a first catching protrusion connected to the fixing shaft.

Also, in the battery pack according to the present invention, the bottom plate (430) may be provided with a rail (431), and the first busbar frame (210) or the second busbar frame (220) may be provided with a second catching protrusion connected to the rail (431).

Also, in the battery pack according to the present invention, each of the first busbar frame (210), the second busbar frame (220), the first busbar (230), and the second busbar (240) may be independently movable in the direction toward the first side plate or the second side plate (420).

Also, in the battery pack according to the present invention, the first busbar (230) or the second busbar (240) may be movable.

Also, in the battery pack according to the present invention, the first busbar frame (210) may be provided with a first guide pole (213), and the first busbar (230) may be provided with a first hole (232) configured to receive the first guide pole (213).

Also, in the battery pack according to the present invention, the first busbar frame (210) may be further provided with a first fastening member (233) mounted to the first guide pole (213).

Also, in the battery pack according to the present invention, the second busbar frame may be provided with a second guide pole, and the second busbar may be provided with a second hole configured to receive the second guide pole.

Also, in the battery pack according to the present invention, the second busbar frame may be further provided with a second fastening member mounted to the second guide pole.

Also, in the battery pack according to the present invention, the connection busbar (250) may be made of a conductive material and may have a corrugated structure.

Also, in the battery pack according to the present invention, the connection busbar (250) may be made of a conductive and elastic material.

Also, in the battery pack according to the present invention, the connection busbar (250) may have a coil shape.

Also, in the battery pack according to the present invention, each of the first busbar (230) and the second busbar (240) may have slits equal in number to a number of the unit cells (110), and electrodes of each of the unit cells (110) may extend through the respective slits and may then be fixed to different positions.

Also, in the battery pack according to the present invention, each of the first busbar (230) and the second busbar (240) may have slits less in number than a number of the unit cells (110), and two or more electrodes may be sequentially stacked and fixed at an identical point of the busbar.

Also, in the battery pack according to the present invention, a cushion member (300) may be further provided between the submodules (100).

In addition, a secondary battery according to the present invention includes the battery pack described above.

DESCRIPTION OF DRAWINGS

FIG. 1 is a perspective view of a conventional battery pack.

FIG. 2 is a perspective view of a battery pack according to a first preferred embodiment of the present invention when viewed from one side thereof.

FIG. 3 is a perspective view of the battery pack according to the first preferred embodiment of the present invention when viewed from the other side thereof.

FIG. 4 is a plan sectional view of the battery pack shown in FIG. 2.

FIG. 5, which is an enlarged view of a dotted part of FIG. 2, is a perspective view illustrating a coupling structure between busbar frames and busbars.

FIG. 6 is a perspective view illustrating a modified coupling structure between the busbar frames and the busbars of FIG. 5.

FIG. 7 is a view illustrating a first modification of a connection busbar of FIG. 5.

FIG. 8 is a view illustrating a second modification of the connection busbar of FIG. 5.

FIG. 9 is a perspective view of a battery pack according to a second preferred embodiment of the present invention when viewed from one side thereof.

FIG. 10 is a perspective view of the battery pack according to the second preferred embodiment of the present invention when viewed from the other side thereof.

FIG. 11 is an enlarged view of part A of FIG. 9.

FIG. 12 is an enlarged view of part B of FIG. 9.

FIG. 13 is a sectional view illustrating a coupling structure between busbars and electrode leads in a battery pack according to a third preferred embodiment of the present invention.

FIG. 14 is a sectional view illustrating a coupling structure between busbars and electrode leads in a battery pack according to a fourth preferred embodiment of the present invention.

FIG. 15 is a sectional view illustrating a coupling structure between busbars and electrode leads in a battery pack according to a fifth preferred embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery pack having a movable busbar assembly according to the present invention and a secondary battery including the same will be described with reference to the accompanying drawings.

FIG. 2 is a perspective view of a battery pack according to a first preferred embodiment of the present invention when viewed from one side thereof, FIG. 3 is a perspective view of the battery pack according to the first preferred embodiment of the present invention when viewed from the other side thereof, and FIG. 4 is a plan sectional view of the battery pack shown in FIG. 2.

Referring to FIGS. 2 to 4, the battery pack according to the first embodiment of the present invention includes a submodule 100, a busbar assembly 200, a cushion member 300, and a pack case 400.

The submodule 100 will be described first. The submodule 100 includes at least three unit cells 110, each of which includes an electrode assembly 111 and a positive electrode lead 112 and a negative electrode lead 113 disposed at opposite sides of the electrode assembly 111, wherein the unit cells 110 are disposed in parallel.

Meanwhile, the electrode assembly 111 may be a jelly-roll type electrode assembly, which is configured to have a structure in which a long sheet type positive electrode and a long sheet type negative electrode are wound in the state in which a separator is disposed between the positive electrode and the negative electrode, a stacked type electrode assembly including unit cells, each of which is configured to have a structure in which a rectangular positive electrode and a rectangular negative electrode are stacked in the state in which a separator is interposed therebetween, a stacked and folded type electrode assembly configured to have a structure in which unit cells are wound using a long separation film, or a laminated and stacked type electrode assembly configured to have a structure in which unit cells are stacked in the state in which a separator is interposed therebetween and are then attached to each other. However, the present invention is not limited thereto.

The electrode assembly is mounted in a case, wherein the case is generally configured to have a laminate sheet structure including an inner layer, a metal layer, and an outer layer. The inner layer is in direct contact with the electrode assembly, whereby the inner layer must exhibit high insulation properties and high resistance to an electrolytic solution. In addition, the inner layer must exhibit high sealability in order to hermetically seal the case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene-acrylic acid, or polybutylene, a polyurethane resin, and a polyimide resin, which exhibit excellent chemical resistance and high sealability. However, the present invention is not limited thereto. Polypropylene, which exhibits excellent mechanical-physical properties, such as tensile strength, rigidity, surface hardness, and resistance to impact strength, and excellent chemical resistance, is the most preferably used.

The metal layer, which abuts the inner layer, corresponds to a barrier layer configured to prevent moisture or various kinds of gas from permeating into a battery from the outside. Aluminum foil, which is light and easily formable, may be used as a preferred material of the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

Meanwhile, the leads, i.e. the positive electrode lead 112 and the negative electrode lead 113, may be exposed out of the case after being electrically connected to a positive electrode tab and a negative electrode tab of the electrode assembly, respectively. Alternatively, the leads may directly connect the electrode assembly and the outside of the case to each other without the positive electrode tab and the negative electrode tab. However, the present invention is not limited thereto. The battery cell described above corresponds to a generally known construction, and therefore a more detailed description thereof will be omitted.

The submodule 100 means a structure configured such that a plurality of unit cells 110, each of which includes an electrode assembly 111 and electrode leads 112 and 113 extending from the electrode assembly 111, is stacked side by side in a horizontal direction or in a vertical direction in order to satisfy required capacity or output of the battery pack. FIGS. 2 and 3 show that one submodule 100 includes three unit cells 110. However, this is merely an illustration. It is obvious that the submodule 100 may include two or more unit cells 110.

A plurality of submodules 100, each of which is configured as described above, is received in the pack case 400 in the state of being arranged side by side.

The busbar assembly 200 is configured to fix the unit cells 110 constituting each submodule 100 to the pack case 400 while connecting the unit cells 110 to each other in series or in parallel. The busbar assembly 200 includes at least one busbar frame, at least one busbar, and/or a connection busbar.

Specifically, referring to FIG. 2, a plurality of first busbars 230 configured to connect three unit cells 110 to each other in parallel and a first busbar frame 210 configured to support and fix the first busbars 230 are located at the front surface of the battery pack.

That is, the positive electrode lead 112 or the negative electrode lead 113 extending from the electrode assembly 111 of each unit cell 110 extends through a first slit 231 of a corresponding one of the first busbars 230 and is then bent. Subsequently, the positive electrode lead 112 or the negative electrode lead 113 is fixed to the outer surface of the first busbar 230 using a well-known fixing method, such as laser welding or resistance welding.

Also, in order to connect the submodules 100 to each other in series, a connection busbar 250, bent in a predetermined shape, is provided between adjacent submodules 100. The connection busbar 250 interconnects the first busbars 230 using a well-known fixing means, in the same manner as in the case of the positive electrode lead 112 and the first busbar 230.

Meanwhile, no connection busbar 250 is located between a primary first busbar and a secondary first busbar located at the leftmost of the battery pack 1 (the uppermost part of the battery pack 1 in FIG. 2). This structure is provided to connect the submodules 100 to each other in series. These submodules are electrically connected to each other via a second busbar 240 at the rear surface of the battery pack.

The rear surface of the battery pack will be described in detail with reference to FIG. 3. A plurality of second busbars 240 configured to connect the unit cells 110 constituting each submodule 100 to each other in series and a second busbar frame 220 configured to support and fix the second busbars 240 are located at the rear surface of the battery pack according to the present invention.

Consequently, the unit cells 110 in a single submodule 100 are connected to each other in parallel, and the submodules 100 are connected to each other in series via the first busbars 230 or the second busbars 240 (see FIG. 4).

An elastic cushion member 300 may be provided between a submodule 100 and another submodule 100 adjacent thereto. The cushion member 300 is configured to minimize transmission of external force to a submodule 100 located adjacent to a specific unit cell 110 when the specific unit cell 110 swells to thus prevent short circuit between the leads.

The pack case 400 serves to support the busbar assembly 200 while receiving the submodules 100. The pack case 400 includes a first side plate 410 located at one side of the submodules 100 side by side, a second side plate 420 located at the other side of the submodules 100 side by side, and a bottom plate 430 located at the bottom of the submodules 100.

The first side plate 410, the second side plate 420, and the bottom plate 430 may be assembled using a well-known fixing method, such as an interference fitting method, a bolt fastening method, or a welding method. An adhesive sealant may be interposed between respective assembled portions.

Meanwhile, a pair of first fixing shafts 440 and a pair of second fixing shafts 450 may be further provided at the front surface and the rear surface of the battery pack, respectively, in order to maintain the distance between the first side plate 410 and the second side plate 420 even in the case in which the unit cells 110 expand due to swelling.

The battery pack according to the present invention may be configured to have a structure in which at least one of the first busbar frame 210, the second busbar frame 220, the first busbar 230, and the second busbar 240 is movable toward the first side plate 410 and/or the second side plate 420.

First, a structure in which the first busbar 230 and the second busbar 240 are movable in the state in which the first busbar frame 210 and the second busbar frame 220 are fixed to the pack case 400 will be described with reference to FIGS. 5 to 8.

FIG. 5, which is an enlarged view of a dotted part of FIG. 2, is a perspective view illustrating a coupling structure between the busbar frames and the busbars.

The first busbar 230, which is provided with a plurality of first slits 231, is provided with at least one first hole 232, which is a long hole, formed at each of the upper part and the lower part thereof. A first guide pole 213, which protrudes from the first busbar frame 210, is inserted into the first hole 232. Here, the height of the first guide pole 213 is preferably slightly greater than the outer diameter of the first hole 232 such that the first guide pole 213 is movable leftwards and rightwards along the first hole 232. More specifically, the height of the first guide pole 213 may be 1 to 10 mm greater than the outer diameter of the first hole 232.

In FIG. 5, the first hole is shown as a long oval hole. However, it is obvious that the first hole may be configured in a long hole structure having any of various shapes, such as a rectangle.

Meanwhile, a female screw thread is preferably formed at the inner surface of the first guide pole 213 such that the first busbar 230 is detachably attached to the first busbar frame 210. Also preferably, a first fastening member 233 having a male screw thread formed on the outer surface of a cylinder thereof so as to be fastened to the female screw thread by male-female screw engagement is provided. More preferably, a head portion is provided at one side of the cylinder such that the first fastening member has a "T" shape or a "ㄱ" shape.

In the above structure, the entirety of the first busbar frame 210 is movable a predetermined distance leftwards and rightwards along the first hole 232 when the electrode assembly 111 swells. As a result, it is possible to prevent short circuit between the leads. In addition, attachment and detachment between the first busbar frame 210 and the first busbar 230 is very easily achieved.

FIG. 6 is a perspective view illustrating a modified coupling structure between the busbar frames and the busbars of FIG. 5. The coupling structure shown in this figure is identical in construction to the coupling structure shown in FIG. 5 except for only the first guide pole 213 and the first fastening member 233, and therefore only the difference will be described hereinafter.

The first guide pole 213 and the first fastening member 233 may be coupled to each other by interference fitting. Specifically, the first guide pole 213 may have the shape of a hollow quadrangular prism, and the first fastening member 233 may include a quadrangular-prism-shaped insertion portion, configured to be inserted into the first guide pole 213, and a head portion.

Of course, it is obvious that the section of the insertion portion of the first fastening member 233 must be slightly larger than the inner section of the first guide pole 213 such that the first fastening member 233 is not overly loosened. In the figure, each of the first guide pole and the first fastening member is shown as being rectangular. However, it is obvious that each of the first guide pole and the first fastening member may have any of various shapes, such as a triangle or a pentagon.

Meanwhile, although the first fastening member 233 is inserted into the first guide pole 213, it is preferable that the first guide pole 213 be inserted into the first fastening member 233 in order to achieve easy assembly between the first guide pole 213 and the first fastening member 233 and to prevent disturbance in movement of the first bus bar 230.

FIG. 7 is a view illustrating a first modification of the connection busbar of FIG. 5. The coupling structure shown in this figure is identical in construction to the coupling structure shown in FIG. 5 except for only the connection busbar 250, and therefore only the connection busbar 250 will be described hereinafter.

The connection busbar 250 according to the first modification may be made of a conductive material and may have a corrugated structure. Even though the first busbar 230 is movable along the first guide pole 213, it is difficult to secure a sufficient movement distance through only buffering force of the cushion member 300 and the connection busbar 250, which is bent so as to have a predetermined shape. However, in the case in which the connection busbar 250 having the corrugated structure is adopted, as in the first modification, it is possible to secure a longer movement distance to thus prevent short circuit between the leads. Here, the conductive material is not particularly restricted as long as the conductive material is capable of allowing electrical conduction.

FIG. 8 is a view illustrating a second modification of the connection busbar of FIG. 5. The coupling structure shown in this figure is identical in construction to the coupling structure shown in FIG. 5 except for only the connection busbar 250, and therefore only the connection busbar 250 will be described hereinafter.

The connection busbar 250 according to the second modification is not particularly restricted as long as the connection busbar is made of an elastic conductive material. As an example, the connection busbar may have a corrugated structure or a coil shape. Here, in the case in which the connection busbar is a conductive coil, the connection busbar may be made of conductive rubber, a gold-silver nanocomplex formed by coating the surface of a silver nanowire with gold and mixing the same with poly(styrene-butadiene-styrene) (SBS), carbon nanotube, or a carbon-rubber complex.

Of course, the busbars may be somewhat loosely connected to each other using a flexible wire in order to achieve the same object and function, although the length of each busbar is neither increased nor decreased.

In the case in which the connection busbar 250 according to the second modification is adopted, it is possible to easily secure the movement distance and to move the first busbar 230 using small force.

Although the structure in which the first busbar 230 is movable at the front surface of the battery pack was described above with reference to FIGS. 5 to 8, it is obvious that the same structure is adopted for the second busbar 240 such that the second busbar 240 is movable.

Next, a structure in which the first busbar frame 210 and the second busbar frame 220 are movable in the state in which the first busbar 230 and the second busbar 240 are fixed respectively to the first busbar frame 210 and the second busbar frame 220 will be described with reference to FIGS. 9 to 12.

FIG. 9 is a perspective view of a battery pack according to a second preferred embodiment of the present invention when viewed from one side thereof, and FIG. 10 is a perspective view of the battery pack according to the second preferred embodiment of the present invention when viewed from the other side thereof.

The battery pack according to this embodiment is identical in construction to the battery pack according to the first embodiment shown in FIGS. 2 and 3 except that catching protrusions are provided at each busbar frame and a rail is formed at the bottom plate, and therefore only the difference will be described hereinafter.

In the battery pack according to the second preferred embodiment of the present invention, a 1-1th catching protrusion 211 is formed at the upper part of the first busbar frame 210, and a 2-1th catching protrusion 212 is formed at the lower part of the first busbar frame 210.

The 1-1th catching protrusion 211 will be described in more detail with reference to FIG. 11, which is an enlarged view of part A of FIG. 9. A 1-1th catching protrusion 211 having a semi-ring shape, such as a C shape, is formed at the upper part of the first busbar frame 210. The 1-1th catching protrusion 211 is fastened to the first fixing shaft 440.

Referring to FIG. 12, which is an enlarged view of part B of FIG. 9, a "⊏"-shaped 2-1th catching protrusion 212 is formed at the lower part of the first busbar frame 210, and a rail 431 having a recess formed therein is provided at the bottom plate 430 such that the 2-1th catching protrusion 212 is fastened to the rail 431.

In brief, as shown in FIGS. 11 and 12, the 1-1th catching protrusion 211 of the first busbar frame 210 is fastened to the first fixing shaft 440, and the 2-1th catching protrusion 212 is fastened to the rail 431 of the bottom plate 430, whereby the first busbar frame is slidable leftwards and rightwards.

Although a detailed figure and a description of the rear surface of the battery pack according to the present invention are omitted, it is obvious that catching protrusions and a rail having the same structures as those shown in FIGS. 11 and 12 may be provided.

Meanwhile, each of the 1-1th catching protrusion 211 of the first busbar frame 210 and the 1-2th catching protrusion 221 of the second busbar frame 220 may have a semi-ring shape, such as a C shape, and the 1-1th catching protrusion 211 and the 1-2th catching protrusion 221 may be fastened to the first fixing shaft 440 and the second fixing shaft 450, respectively.

Furthermore, the first busbar 230 and the second busbar 240 may not be fixed to the first busbar frame 210 and the second busbar frame 220, respectively, and the structure in which the first busbar 230 and the second busbar 240 are movable may be adopted, as described with reference to FIGS. 5 to 8.

In this case, each of the first busbar frame 210, the second busbar frame 220, the first busbar 230, and the second busbar 240 may be independently movable, whereby it is possible to most effectively prevent short circuit between the electrode leads.

FIG. 13 is a sectional view illustrating a coupling structure between busbars and electrode leads in a battery pack according to a third preferred embodiment of the present invention.

In the third embodiment of the present invention, busbars having the same shape may be connected to the front surface and the rear surface of each submodule, and leads constituting a single submodule may be fixed to the busbars in the state of overlapping each other.

Specifically, a cushion member 300 is located between submodules, each of which includes three unit cells, and a first busbar 230 and a second busbar 240, each of which has slits identical in number to the leads, are electrically connected to each other via a connection busbar 250. In addition, positive electrode leads 112 or negative electrode leads 113 extending through the respective slits are fixed to the same positions of the respective busbars located in the state of being spaced apart from each other so as to overlap each other.

Of course, although not shown in the figure, the number of slits in the busbars may be less than the number of leads. In this case, one or more leads may extend through a single slit and may then be fixed to the same positions of the busbars so as to overlap each other.

In the above structure, it is possible to reduce the size of each busbar. Furthermore, it is possible to easily secure a space in which the busbars are movable.

FIG. 14 is a sectional view illustrating a coupling structure between busbars and electrode leads in a battery pack according to a fourth preferred embodiment of the present invention.

In the fourth embodiment of the present invention, all unit cells are connected to each other in series. In a single submodule, unit cells are located such that a positive electrode terminal and a negative electrode terminal are opposite each other. Specifically, a positive electrode lead 112 and a negative electrode lead 113 disposed at one side so as to face the same direction are respectively fixed to first busbars 230 located so as to be spaced apart from each other by a predetermined distance. In addition, the first busbars 230 are electrically connected to each other via a connection busbar 250. Meanwhile, a negative electrode lead 113 and a positive electrode lead 112 disposed at the other side are fixed to an identical second busbar 240. A cushion member 300 may be selectively located between submodules.

FIG. 15 is a sectional view illustrating a coupling structure between busbars and electrode leads in a battery pack according to a fifth preferred embodiment of the present invention.

All unit cells are connected to each other in series, in the same manner as in the fourth embodiment. In the fifth embodiment, however, a positive electrode lead 112 and a negative electrode lead 113 are fixed to different first busbars 230 or different second busbars 240.

Specifically, a positive electrode lead 112 and a negative electrode lead 113 disposed at one side so as to face the same direction are respectively fixed to first busbars 230 spaced apart from each other by a predetermined distance, and a negative electrode lead 113 and a positive electrode lead 112 disposed at the other side are also respectively fixed to second busbars 240 spaced apart from each other by a predetermined distance. In addition, the first busbars 230 and the second busbars 240 are connected to each other via a plurality of connection busbars 250.

Meanwhile, although sectional views of the busbars and the electrode leads are only shown in the third embodiment to the fifth embodiment, it is obvious that the busbar moving structure, the busbar frame moving structure, and the elastic connection busbar described in the first and second embodiments may be applied.

Although the present invention has been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS

1: Battery pack
100: Submodule

110: Unit cell
111: Electrode assembly 112: Positive electrode lead
113: Negative electrode lead
200: Busbar assembly
210: First busbar frame
211: 1-1th catching protrusion 212: 2-1th catching protrusion
213: First guide pole
220: Second busbar frame
221: 1-2th catching protrusion
230: First busbar
231: First slit 232: First hole
233: First fastening member
240: Second busbar
241: Second slit
250: Connection busbar
300: Cushion member
400: Pack case
410: First side plate
420: Second side plate
430: Bottom plate
431: Rail
440: First fixing shaft
450: Second fixing shaft

INDUSTRIAL APPLICABILITY

A battery pack according to the present invention has an advantage in that busbars and/or busbar frames are movable, whereby it is possible to prevent damage to tabs and leads of unit cells and to connections between the leads and the busbars even when a swelling phenomenon occurs.

In addition, in the battery pack according to the present invention, it is possible to prevent a reduction in overall performance of the battery pack and to improve safety of a battery by preventing damage to the tabs and the leads of the unit cells and to the connections between the leads and the busbars.

Furthermore, in the battery pack according to the present invention, it is possible to reuse the battery while increasing the lifespan of the battery, whereby it is possible to reduce the amount of waste.

The invention claimed is:

1. A battery pack comprising:
a plurality of submodules, each of the plurality of submodules having one or more unit cells disposed therein, each of the one or more unit cells comprising an electrode assembly and a positive electrode lead and a negative electrode lead disposed at opposite sides of the electrode assembly;
a busbar assembly configured to connect the plurality of submodules to each other in series or in parallel, the busbar assembly comprising:
a first busbar frame;
a second busbar frame;
a first busbar connected to the first busbar frame; and
a second busbar connected to the second busbar frame; and
a pack case configured to support the busbar assembly while receiving the plurality of submodules, the pack case comprising:
a first side plate located at a first side of the submodules side by side,
a second side plate located at a second side of the submodules side by side,
a bottom plate located at a bottom of the submodules, and
wherein at least one of the first busbar frame, the second busbar frame, the first busbar, and the second busbar is movable in a direction toward the first side plate or the second side plate,
wherein the bottom plate is provided with a rail, and
wherein the first busbar frame or the second busbar frame is provided with a second catching protrusion connected to the rail.

2. The battery pack according to claim 1, wherein the plurality of submodules are N submodules, N being a natural number equal to or greater than 3, each of the N submodules having two or more unit cells disposed in parallel,
wherein, to connect the N submodules to each other in series, the first busbar frame, the first busbar, and a connection busbar configured to connect every two adjacent submodules after an N-2th submodule to each other in series are located at a front surface of the pack case, and
wherein the second busbar frame and the second busbar, configured to connect every two adjacent submodules from the N-2th submodule to each other in series, are located at a rear surface of the pack case.

3. The battery pack according to claim 2, wherein the connection busbar is made of a conductive material and has a corrugated structure.

4. The battery pack according to claim 2, wherein the connection busbar is made of a conductive and elastic material.

5. The battery pack according to claim 4, wherein the connection busbar has a coil shape.

6. The battery pack according to claim 1, wherein the submodules are N submodules, N being a natural number equal to or greater than 2, each of the N submodules having two unit cells located such that a positive electrode terminal and a negative electrode terminal are opposite each other, and
wherein, to connect the two unit cells to each other in series, a positive electrode lead and a negative electrode lead disposed at a first side are respectively fixed to a plurality of first busbars located so as to be spaced apart from each other by a predetermined distance, and a negative electrode lead and a positive electrode lead disposed at a second side are fixed to a second busbar.

7. The battery pack according to claim 1, wherein the submodules are N submodules, N being a natural number equal to or greater than 2, each of the N submodules having one unit cell, and
wherein, to connect the unit cells to each other in series, a positive electrode lead and a negative electrode lead disposed so as to be adjacent to each other at a first side are fixed to the first busbar, and a negative electrode lead and a positive electrode lead disposed so as to be adjacent to each other at a second side are fixed to the second busbar.

8. The battery pack according to claim 1, wherein only the first busbar frame or the second busbar frame is movable in a state in which the first busbar and the second busbar are fixed respectively to the first busbar frame and the second busbar frame.

9. The battery pack according to claim 8, wherein a fixing shaft is provided between the first side plate and the second side plate, and
wherein the first busbar frame or the second busbar frame is provided with a first catching protrusion connected to the fixing shaft.

10. The battery pack according to claim 1, wherein each of the first busbar frame, the second busbar frame, the first busbar, and the second busbar is independently movable in the direction toward the first side plate or the second side plate.

11. The battery pack according to claim 1, wherein the first busbar or the second busbar is movable.

12. The battery pack according to claim 1, wherein each of the first busbar and the second busbar has slits equal in number to a number of the unit cells, and
wherein electrodes of each of the unit cells extend through the respective slits and are fixed to different positions.

13. The battery pack according to claim 1, wherein each of the first busbar and the second busbar has slits less in number than a number of the unit cells, and two or more electrodes are sequentially stacked and fixed at an identical point of the busbar.

14. The battery pack according to claim 1, further comprising a cushion member provided between the submodules.

15. A secondary battery comprising the battery pack according to claim 1.

16. A battery pack comprising:
a plurality of submodules, each of the plurality of submodules having one or more unit cells disposed therein, each of the one or more unit cells comprising an electrode assembly and a positive electrode lead and a negative electrode lead disposed at opposite sides of the electrode assembly;
a busbar assembly configured to connect the plurality of submodules to each other in series or in parallel, the busbar assembly comprising:
a first busbar frame;
a second busbar frame;
a first busbar connected to the first busbar frame; and
a second busbar connected to the second busbar frame; and
a pack case configured to support the busbar assembly while receiving the plurality of submodules, the pack case comprising:
a first side plate located at a first side of the submodules side by side,
a second side plate located at a second side of the submodules side by side, and
a bottom plate located at a bottom of the submodules,
wherein at least one of the first busbar frame, the second busbar frame, the first busbar, and the second busbar is movable in a direction toward the first side plate or the second side plate, and
wherein the first busbar frame is provided with a first guide pole, and
wherein the first busbar is provided with a first hole configured to receive the first guide pole.

17. The battery pack according to claim 16, wherein the first busbar frame is further provided with a first fastening member mounted to the first guide pole.

18. The battery pack according to claim 16, wherein the second busbar frame is provided with a second guide pole, and
wherein the second busbar is provided with a second hole configured to receive the second guide pole.

19. The battery pack according to claim 18, wherein the second busbar frame is further provided with a second fastening member mounted to the second guide pole.

* * * * *